(12) United States Patent
Risvik et al.

(10) Patent No.: US 8,626,781 B2
(45) Date of Patent: Jan. 7, 2014

(54) PRIORITY HASH INDEX

(75) Inventors: Knut Magne Risvik, Mo I Rana (NO); Michael Hopcroft, Kirkland, WA (US); John G. Bennett, Bellevue, WA (US); Karthik Kalyanaraman, Bellevue, WA (US); Trishul Chilimbi, Seattle, WA (US); Hui Shen, Beijing (CN)

(73) Assignee: Microsoft Corporation, Redmond, WA (US)

(*) Notice: Subject to any disclaimer, the term of this patent is extended or adjusted under 35 U.S.C. 154(b) by 245 days.

(21) Appl. No.: 12/980,582

(22) Filed: Dec. 29, 2010

(65) Prior Publication Data

US 2012/0173510 A1 Jul. 5, 2012

(51) Int. Cl.
*G06F 7/00* (2006.01)

(52) U.S. Cl.
USPC ........... 707/758; 707/765; 707/769; 711/100; 711/108

(58) Field of Classification Search
USPC ........... 707/711, 758, 765, 769; 711/100, 108
See application file for complete search history.

(56) References Cited

U.S. PATENT DOCUMENTS

| | | | | |
|---|---|---|---|---|
| 8,239,584 | B1* | 8/2012 | Rabe et al. | 711/170 |
| 2005/0071571 | A1* | 3/2005 | Luick | 711/137 |
| 2006/0018551 | A1* | 1/2006 | Patterson | 382/229 |
| 2008/0052436 | A1* | 2/2008 | Sharma et al. | 710/301 |
| 2008/0065639 | A1 | 3/2008 | Choudhary | |
| 2008/0243941 | A1 | 10/2008 | Beyer | |
| 2009/0049086 | A1* | 2/2009 | Hsu et al. | 707/103 R |
| 2009/0187546 | A1* | 7/2009 | Hamilton Whyte | 707/3 |
| 2010/0098318 | A1 | 4/2010 | Anderson | |
| 2010/0199036 | A1* | 8/2010 | Siewert et al. | 711/112 |
| 2011/0196855 | A1* | 8/2011 | Wable et al. | 707/711 |

OTHER PUBLICATIONS

Qwertie, CPTrie: A Sorted Data Structure for .NET—Published Date: Mar. 31, 2010 http://www.codeproject.com/KB/recipes/cptrie.aspx.
Askitis, Nikolas, et al., HAT-Trie: A Cache-Conscious Trie-Based Data Structure for Strings—Published Date: 2007 http://crpit.com/confpapers/CRPITV62Askitis.pdf.
Woo, Dong Hyuk, et al., Reducing Energy of Virtual Cache Synonym Lookup using Bloom Filters—Published Date: 2006 http://www.cecs.uci.edu/~papers/esweek06/cases/p179.pdf.
Chu, Yuan-Sun, et al., ASIC Design of Fast IP Lookup for Next Generation IP Router—Published Date: 2005 http://eeweb.poly.edu/labs/hsnl/docs/private/security/01465464.pdf.
Fitzpatrick, Brad, Distributed Caching with MemCached—Published Date: Aug. 1, 2004 http://www.linuxjournal.com/article/7451.
Acharya, Anurag, et al., Adaptive Algorithms for Cache-Efficient Trie Search—Published Date: Jul. 7, 1998 http://game.cs.ucsb.edu/research/tech_reports/reports/1998-19.ps.
Debnath, Biplob, et al., ChunkStash: Speeding Up Inline Storage Deduplication Using Flash Memory—Retrieved Date: Aug. 13, 2010 http://research.microsoft.com/pubs/132038/paper.pdf.

* cited by examiner

*Primary Examiner* — Hosain Alam
*Assistant Examiner* — Jieying Tang
(74) *Attorney, Agent, or Firm* — Shook Hardy & Bacon LLP (57) ABSTRACT

A priority hash index provides efficient lookup of posting lists for search query terms. The priority hash index is a data structure in which hash values for terms are distributed across multiple storage devices based on importance of the terms and access speeds of the storage devices. Terms are grouped into search lists with each search list including a storage location on each storage device. When a search query is received, a term is identified and hashed to a location on the first storage device and to generate a unique hash value for the term. The locations on the storage device for the term's search list are sequentially read until the hash value for the term is located to access the posting list for the term.

10 Claims, 5 Drawing Sheets

PRIORITY HASH INDEX

BACKGROUND

The amount of information and content available on the Internet continues to grow rapidly. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the most popular service on the Internet today.

Search engines operate by crawling documents and indexing information regarding the documents in a search index. Search indexes are often comprised of posting lists for the various terms found in the crawled documents. Each posting list identifies the documents in which a particular term was found. When a search query is received, the search engine employs the search index to identify documents relevant to the search query. Use of a search index in this manner allows for fast retrieval of information for queries. Without a search index, a search engine would need to search the corpus of documents to find relevant results, which would take an unacceptable amount of time.

When performing searches, search engines typically employ various mechanisms to provide fast lookup of search query terms in order to locate and retrieve posting lists. Tree-based structures and in-memory hash tables are examples of common methods used for this purpose. However, these existing mechanisms are not truly efficient when scaling up to very large numbers of indexed objects, and the lookup performance may not be sufficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a priority hash index that provides efficient lookup of posting lists for search query terms. The priority hash index is a data structure in which hash values for terms are distributed across a hierarchy of storage devices of varying access speed based on term importance from fastest storage to slowest storage. Some storage devices include entries that each includes a hash value with an address of a posting list. In some instances, posting lists are stored inline if the posting lists are small enough. Additionally, if a storage device in the hierarchy has significant input/output latency (e.g., a hard disk drive) such that accessing the device multiple times would significantly affect performance, the posting lists may be stored inline on the storage device. For instance, in some embodiments, storage devices higher in the hierarchy may store entries that each includes a hash value with an address of a posting list, while a final storage device may store posting lists inline with hash values. Terms are grouped into search lists with each search list including a location on each storage device for storing hash values for terms in the search list. When a search query is received, a term is identified and hashed to select a location at a first device and to generate a hash value that is unique to the term. The locations of the storage devices for the search list for the term are sequentially read to locate an entry matching the hash value and to access a posting list for the term.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to a priority hash index that is a data structure that resides on several layers of storage devices to provide for efficient lookup of posting lists for terms in a search index. It should be noted that "term" is used broadly herein to refer to a single word or multiple words (e.g., phrases, n-grams, n-tuples, etc.) found in documents indexed by the search index.

The priority hash index is structured around providing "search lists" for groups of terms indexed by the search system index. Conceptually, a search list is a list structure that is distributed across storage locations on each of the storage devices. The terms in each search list are hashed to unique numbers from which two hash values are derived. The first hash value for all terms in a search list select the same location on a first storage device, which serves as the starting point into the search list. The second hash values disambiguate the various terms in a search list and are stored in the different storage devices based on term importance (highest to lowest) from the fastest storage device to slowest storage device. Term importance may be based on factors such as the length of the posting list associated with the term or access statistics.

In some embodiments of the present invention, higher levels of storage devices (i.e., faster storage devices) store data entries that each generally includes a hash value for a term and an address of a posting list for the term. In some instances, if a posting list is short, the posting list may be stored inline with the hash value. In contrast, lower levels (or the lowest level) of storage (i.e., the slowest storage device(s)) include data entries that each generally includes a hash value for a term with the posting list for the term stored inline. In particular, if a storage device in the hierarchy has significant input/output latency (e.g., a hard disk drive) such that accessing the device multiple times would significantly affect performance, the posting lists may be stored inline on that storage device.

In operation, when a search query is received, a term is identified and hashed to derive two hash values. The first hash value selects a storage location in a first storage device. The storage location is read to determine whether it contains a data entry for the second hash value. If a data entry that includes the second hash value is found at the storage location, an address of the posting list for the term is retrieved from the data entry and used to access the posting list. For instance, the first storage device may be RAM while the posting list is stored in a hard disk drive. As such, the address stored on RAM corresponds with the location on the hard disk drive storing the posting list for the term.

If the storage location on the first storage device does not contain the second hash value, the process continues by retrieving an address of a storage location on the next storage device in the hierarchy of storage devices. The storage location on the next storage device contains the continuation of the search list. The process may continue by sequentially reading storage locations on storage devices in the hierarchy until the second hash value is located. If the second hash value is found at a storage location on the last storage device, the posting list is stored inline with the second hash value. As such, only one access the last storage device (i.e., the slowest storage device) would be required to access the posting list.

Accordingly, in one aspect, an embodiment of the present invention is directed to a system for storing a priority hash index for a search engine. The system includes a first data storage device of a first type. The first data storage device has a plurality of storage locations, wherein a first storage location on the first data storage device stores a plurality of data entries each containing a hash value corresponding with a term and an address locating a posting list for the term. The first storage location also stores an address of a second storage location on a second data storage device. The second data storage device is of a second type and has a plurality of storage locations, wherein the second storage location on the second data storage device stores a plurality of data entries each containing a hash value corresponding with a term and an address locating a posting list for the term. The second storage location also stores an address of a third storage location within a third data storage device. The third data storage device is of a third type and has a plurality of storage locations, wherein the third storage location on the third data storage device stores a plurality of data entries each containing a hash value corresponding with a term and a posting list for the term.

In another embodiment, an aspect of the invention is directed a method for accessing data from a search index. The method includes receiving a hash value corresponding with a search term from a search query. The method also include identifying a first storage location on a first storage device and determining if the hash value is stored at the first storage location. If the hash value is stored at the first storage location, the method includes retrieving an address of a posting list from the first storage location and using that address to access the posting list. If the hash value is not stored at the first storage location, the method includes retrieving an address of a second storage location on a second storage device from the first storage location. The method then includes determining if the hash value is stored at the second storage location. If the hash value is stored at the second storage location, the method includes retrieving an address of a posting list from the second storage location and using that address to access the posting list. If the hash value is not stored at the second storage location, the method includes retrieving an address of a third storage location on a third storage device from the second storage location. The method then includes determining if the hash value is stored at the third storage location. If the hash value is not stored at the third storage location, the method includes determining to abandon searching for the hash value. If the hash value is stored at the third storage location, the method includes accessing a posting list from the third storage location.

A further embodiment of the present invention is directed to one or more computer-storage media storing computer-useable instructions that, when used by a computing device, cause the computing device to perform a method. The method includes receiving a search query, identifying a term from the search query, and hashing the term to generate a first hash value and a second hash value. The method also includes identifying a cacheline in a RAM corresponding with the first hash value, the cacheline containing a plurality of data entries each including a hash value corresponding with a given term and an address of a posting list for the given term. The method further includes determining whether the cacheline contains the second hash value. If the cacheline contains the second hash value, the method includes retrieving from the cacheline an address of a posting list corresponding with the second hash value and using that address to access the posting list. If the cacheline does not contain the second hash value, the method includes retrieving from the cacheline an address of a page in a flash-based solid state device containing a plurality of data entries each including a hash value corresponding with a given term and an address of a posting list for the given term. The method then includes determining whether the page contains the second hash value. If the page contains the second hash value, the method includes retrieving from the page an address of a posting list corresponding with the second hash value and using that address to access the posting list. If the page does not contain the second hash value, the method includes employing a bloom filter stored in the page. If the second hash value fails the bloom filter, the method includes determining to abandon searching for the second hash value. If the second hash value passes the bloom filter, the method includes retrieving from the page an address of a page file in a hard disk drive containing a plurality of data entries each including a hash value corresponding with a given term and a posting list for the given term. The method then includes determining whether the page file contains the second hash value. If the page file does not contain the second hash value, the method includes determining to abandon searching for the second hash value. If the page file contains the second hash value, the method includes accessing from the page file a posting list corresponding with the second hash value.

Figure 1:
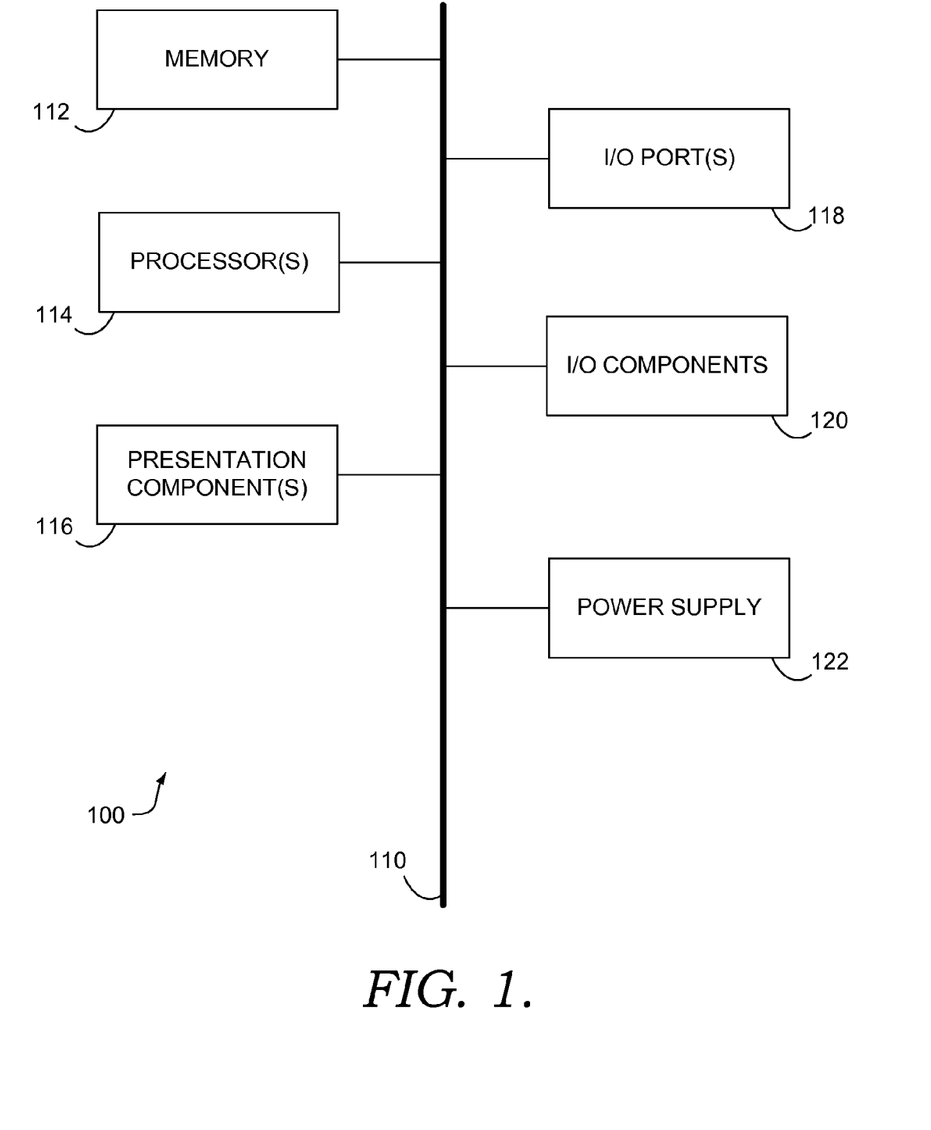
FIG. 1 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
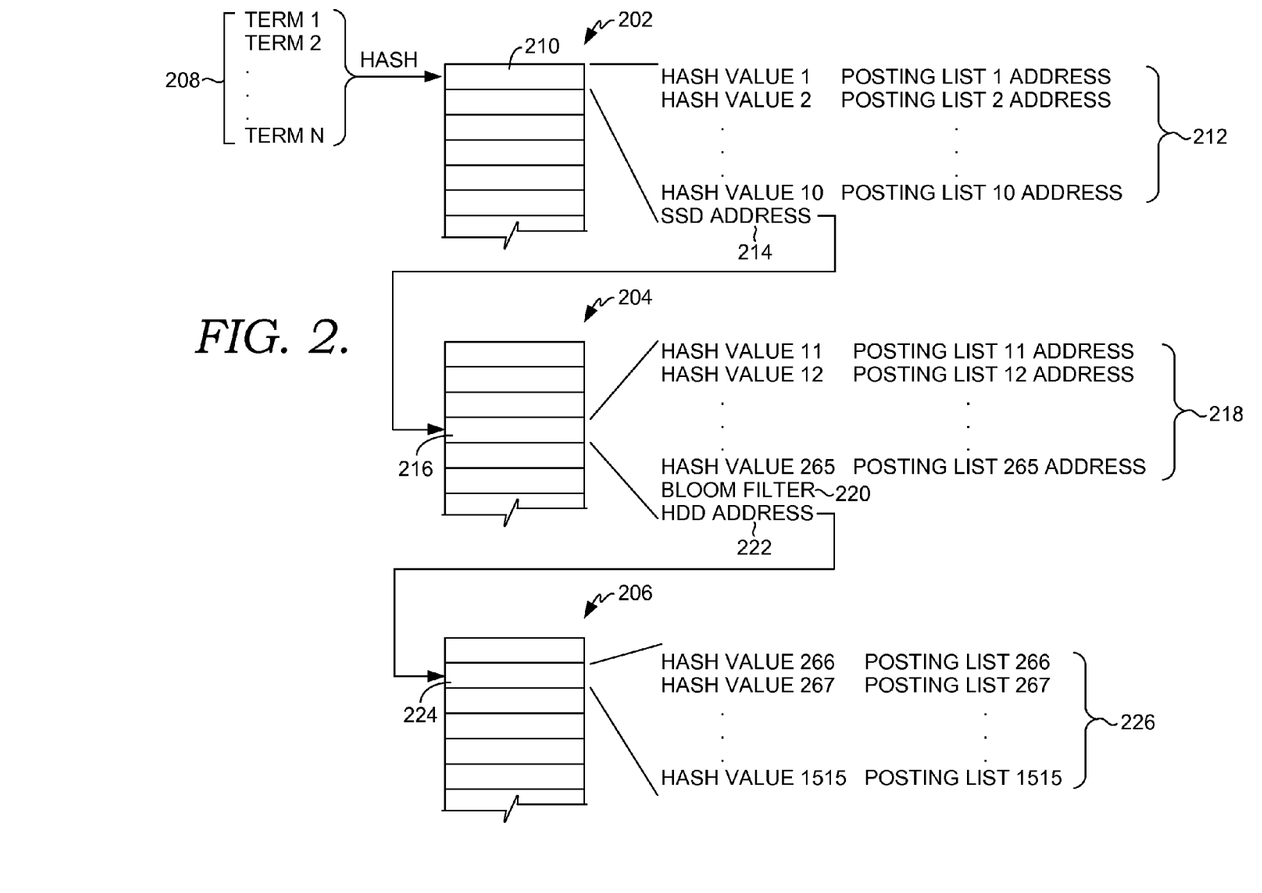
FIG. 2 is a diagram illustrating a priority hash index for a search index in accordance with an embodiment of the present invention.

Turning now to FIG. 2, a diagram is provided that illustrates a priority hash index for a search index in accordance with an embodiment of the present invention. As previously indicated, the priority hash index is a data structure that facilitates efficient lookup of posting lists for terms submitted in search queries. The priority hash index shown in FIG. 2 resides on three storage devices, RAM 202, a flash-based solid state device (SSD) 204, and a hard disk drive (HDD) 206. It should be noted that other types of storage devices may be employed within the scope of embodiments of the present invention. Additionally, although FIG. 2 illustrates a priority hash index spread across three storage devices, a priority hash index in accordance with various embodiments of the present invention may employ two or more storage devices.

In accordance with embodiments of the present invention, terms indexed by the search index are grouped into "search lists." Each search list includes a portion of the terms indexed by the search index and is stored across the three layers of storage: RAM 202, the SSD 204, and the HDD 206. For instance, FIG. 2 illustrates a number of terms 208 that are part of a search list. The terms 208 are each hashed to a unique hash value. Any of a variety of different hash functions may be employed within the various embodiments of the present invention. By way of example only and not limitation, the MD4 hash function may be employed.

In embodiments, hashing the terms provides two hash values. The two hash values may be separate values or may be portions of a larger hash value generated by the hash function. The first hash value serves to identify the search list, while the second hash value serves to disambiguate the various terms in each search list.

By way of illustration, the first hash value for each term in the group of terms 208 selects a cacheline 210 in the RAM 202. As such, the cacheline 210 serves as the entry point into the search list for the group of terms 208. Each of the other cachelines in the RAM 202 serve as the entry point into a different search list comprising a different set of terms indexed by the search index.

The second hash values for the group of terms 208 are spread across the three layers of storage from fastest storage to slowest storage based on the importance of the terms. For instance, hash values for the most important terms are stored in RAM 202, hash values for the next most important terms are stored on the SSD 204, and hash values for the least important terms are stored on the HDD 206. Importance of terms may be based on a number of factors in various embodiments of the present invention. For instance, importance of terms may be based on the length of the posting lists for the terms. In particular, longer posting lists could signify greater importance. Importance of terms may also be based on access statistics regarding the frequency with which each term is historically accessed in response to search queries. Terms that are accessed more frequently may be considered more important. In some embodiments, term importance may be based on a ranking function (e.g., BM25f ranking function or a generic ranking function F(a, q)=(0 . . . 1)).

As shown in FIG. 2, the cacheline 210 in the RAM 202 includes a number of data entries 212. Each data entry includes a hash value and the address of a posting list for the term corresponding with that hash value. In some embodiments, the posting lists may be stored at various locations on the HDD 206, and the address of each data entry may correspond with a location on the HDD 206 at which a posting list is stored. In the example shown in FIG. 2, the cacheline 210 includes data entries for ten hash values. These hash values correspond with the ten most important terms in the search list.

The cacheline 210 also includes an address 214 of a location 216 (e.g., a page) on the SSD 204. The location 216 on the SSD 204 includes the continuation of the search list that was started at the cacheline 210 on the RAM 202. As shown in FIG. 2, the location 216 includes a number of data entries 218. Each data entry includes a hash value and the address of a posting list for the term corresponding with that hash value. In some embodiments, the posting lists may be stored at various locations on the HDD 206, and the address of each data entry may correspond with a location on the HDD 206 at which a posting list is stored. In the example shown in FIG. 2, the location 216 includes data entries for 244 hash values. These hash values correspond with the next most important terms after the first ten stored in the cacheline 210.

The location 216 on the SSD 204 also stores a bloom filter 220. The bloom filter may be constructed based on the remaining hash values of the search list that are stored in the HDD 206. The location 216 on the SSD 204 further includes the address 222 of a location 224 (e.g., page file) on the HDD 206. The location 224 on the HDD 224 includes the continuation of the search list, continuing from the data entries stored at the location 216 on the SSD 204. As shown in FIG. 2, the location 224 on the HDD 224 includes a number of data entries 226. Each data entry includes a hash value and the posting list for the term corresponding with that hash value. In other words, posting lists are stored inline with the hash values on the HDD 224, as opposed to storing addresses as on the RAM 202 and the SSD 204. In the example shown in FIG. 2, the location 216 includes data entries for 1240 hash values. These hash values correspond with the least important terms in the search list.

In some embodiments, short posting lists may be stored inline in the RAM 202 and/or the SSD 204. In particular, if a posting list for a term stored on the RAM 202 or the SSD 204 is shorter than some threshold such that it will not consume too much storage space, the posting list may be stored on the RAM 202 or the SSD 204 with the hash value for the term as opposed to storing the posting list elsewhere and proving an address on the RAM 202 or the SSD 204. This avoids seeks to the HDD 206 in the case of short posting lists.

In operation, when a search query is received, a term is identified and hashed to generate a first and second hash value. For instance, the first hash value for a term in the group of terms 208 would select the cacheline 210 as an entry point into the search list. The data entries at the cacheline are read to determine if they contain the second hash value for the term. If so, the posting list address associated with the stored hash value is used to access the posting list for the term. If not, the SSD address 214 is retrieved from the cacheline 210 and used to access the location 216 on the SSD 204. The data entries stored at the location 216 on the SSD 204 are read to determine if they contain the second hash value. If so, the posting list address with the stored hash value is used to access the posting list for the term. If not, the bloom filer 220 is checked to determine if the second hash value is likely contained by the continuation of the search list on the HDD 206. The bloom filter is used as this point as the next step will be to access the HDD 206, which is extremely slow compared to accessing the RAM 202 and the SSD 204. If the second hash value fails the bloom filter, the second hash value is not stored on the HDD 206 and the process is abandoned. As such, an unnecessary access to the HDD 206 is avoided. Alternatively, if the second hash value passes the bloom filter, the HDD address 222 is retrieved from the location 216 on the SSD 204 and used to access the location 224 on the HDD 206. The data entries 226 stored at the location 224 on the HDD 206 are read to determine if they contain the second hash value. If so, the posting list stored in association with the second hash value is accessed. Because the posting lists for the hash values stored on the HDD 206 are stored inline with the hash values, only one access to the HDD 206 is required to locate the hash value and retrieve the corresponding posting list. If the data entries 226 do not contain the second hash value, the process is abandoned as the term is not indexed by the search system.

Accordingly, the priority hash index of FIG. 2 illustrates a three layered data structure across RAM 202, SSD 204, and HDD 206. This allows for a bounded search to turn up posting lists with at most one short SSD read and one short HDD read.

Figure 3:
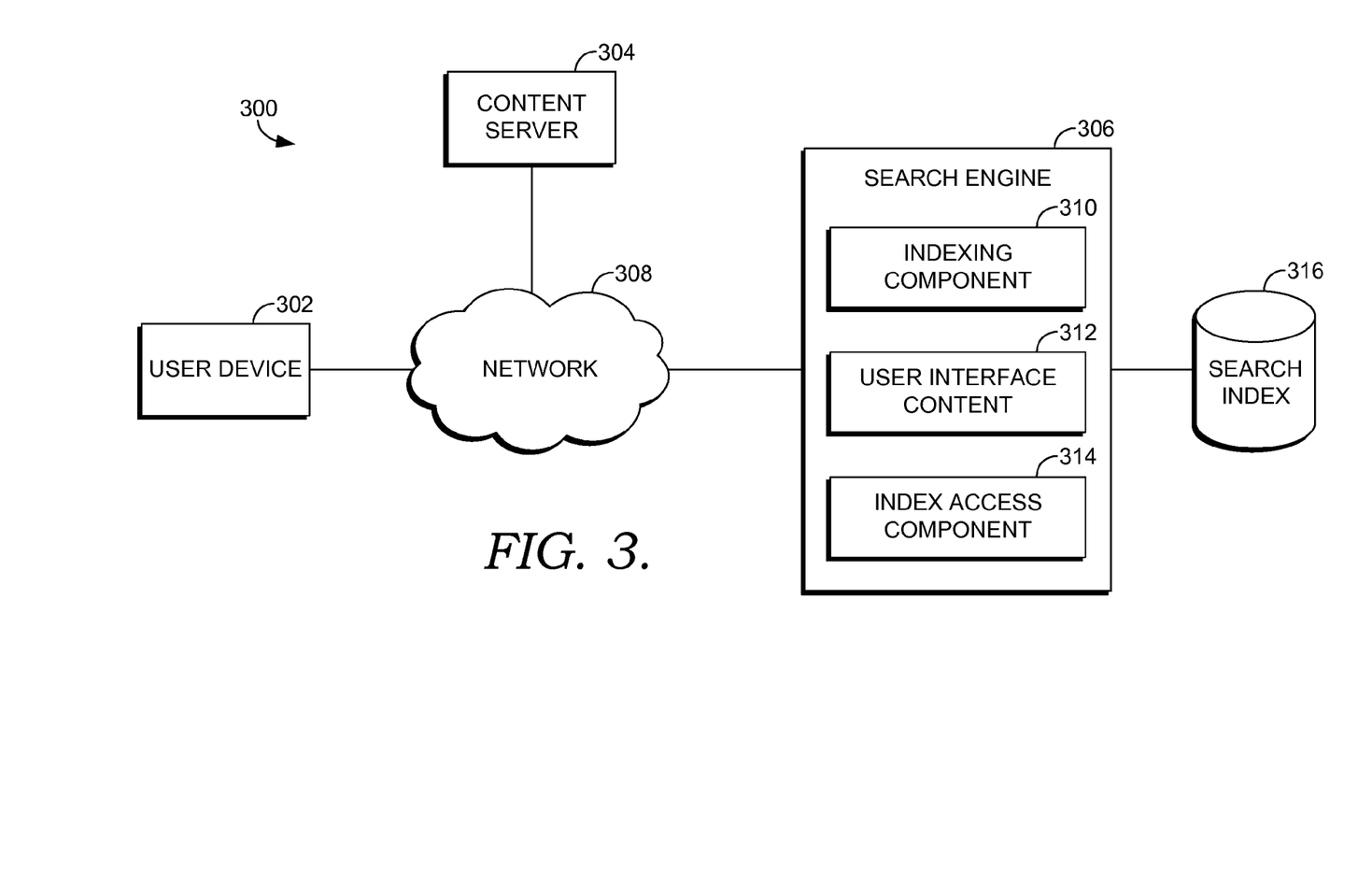
FIG. 3 is a block diagram of an exemplary system in which embodiments of the present invention may be employed.

Referring next to FIG. 3, a block diagram is provided illustrating an exemplary system 300 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 may include a user device 302, content server 304, and search engine server 306. Each of the components shown in FIG. 3 may be any type of computing device, such as computing device 100 described with reference to FIG. 1, for example. The components may communicate with each other via a network 308, which may include, without limitation, one or more local area networks (LANs) and/or wide area networks (WANs). Such networking environments are commonplace in offices, enterprise-wide computer networks, intranets, and the Internet. It should be understood that any number of user devices, content servers, and search engine servers may be employed within the system 300 within the scope of the present invention. Each may comprise a single device or multiple devices cooperating in a distributed environment. For instance, the search engine server 306 may comprise multiple devices arranged in a distributed environment that collectively provide the functionality of the search engine server 306 described herein. Additionally, other components not shown may also be included within the system 300.

The search engine server 306 generally operates to receive search queries from user devices, such as the user device 302, and to provide search results in response to the search queries. The search engine server 306 includes, among other things, an indexing component 310, a user interface component 312, and an index access component 314.

The indexing component 310 operates to index data regarding documents maintained by content servers, such as the content server 304. For instance, a crawling component (not shown) may be employed to crawl content servers and access information regarding documents maintained by the content servers. The indexing component 310 then indexes data regarding the crawled documents in the search index 316, including posting lists for terms identified in the document. In embodiments, the indexing component 310 also generates a priority hash index for efficient lookup of terms in the search index. As discussed previously, the priority hash index is spread across multiple types of storage devices. For instance, in one embodiment, the priority hash index is stored on RAM, a flash-based SDD, and a HDD. Hash values for terms are stored on the storage devices based on importance of terms with hash values of more important terms filling the fastest storage device first and hash values of less important terms being stored on slower storage devices.

The user interface component 312 provides an interface to user devices, such as the user device 302, that allows users to submit search queries to the search engine server 306 and to receive search results from the search engine server 306. The user device 302 may be any type of computing device employed by a user to submit search queries and receive search results. By way of example only and not limitation, the user device 302 may be a desktop computer, a laptop computer, a tablet computer, a mobile device, or other type of computing device. The user device 302 may include an application that allows a user to enter a search query and submit the search query to the search engine server 306 to retrieve search results. For instance, the user device 302 may include a web browser that includes a search input box or allows a user to access a search page to submit a search query. Other mechanisms for submitting search queries to search engines are contemplated to be within the scope of embodiments of the present invention.

When a search query is received via the user interface component 312, one or more terms are identified from the search query. The index access component 314 then operates to identify a posting list for each term in the search index 316. The index access component 314 employs the priority hash index generated by the indexing component 310 to identify a location at which the posting list for each term is stored. In embodiments, the index access component 314 hashes a term to identify a location on the first storage device and to generate a hash value that is used to identify a posting list for the term. The index access component 310 sequentially accesses each storage device storing the priority hash index until the hash value for the term is located and then retrieves the corresponding posting list (unless the term is not indexed in which case the process is abandoned).

Posting lists retrieved by the index access component 314 for the terms in a received search query are used to generate search results for the search query. The search results may then be communicated to the user device 302 by the user interface component 312 such that the search results may be presented to the end user who submitted the search query.

Figure 4:
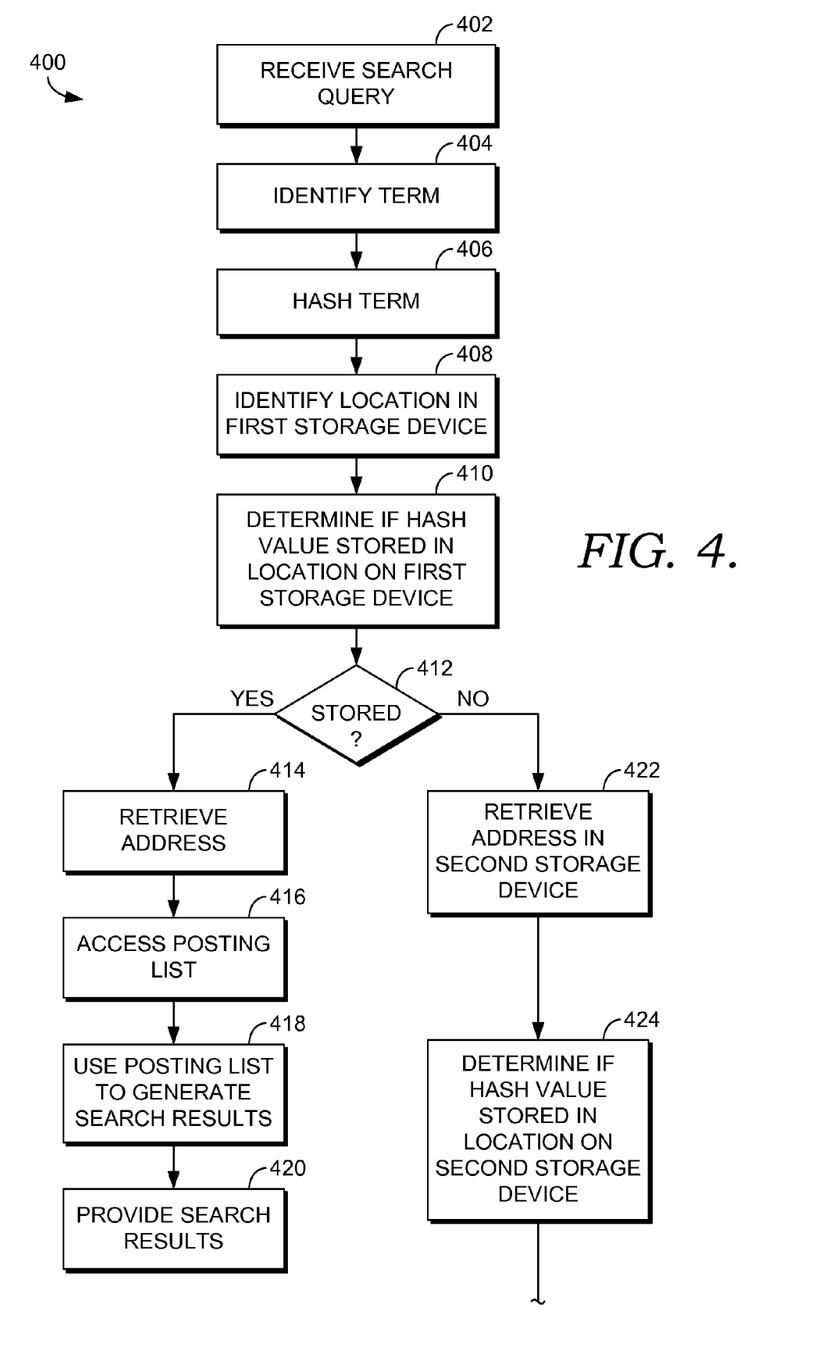
FIG. 4 is a flow diagram showing a method for accessing data in a search index using a priority hash index in accordance with an embodiment of the present invention.

With reference now to FIG. 4, a flow diagram is provided that illustrates a method 400 for access data from a search index via a priority hash index in accordance with an embodiment of the present invention. Initially, a search query is received by a search engine, as shown at block 402. The search query may include one or more terms. At least one term is identified for further processing, as shown at block 404. The term is hashed at block 406 by applying a hash function to the term. Any of a variety of different hash functions may be employed within the various embodiments of the present invention. By way of example only and not limitation, the MD4 hash function may be employed.

The processing of hashing the term at block 406 may include generating two hash values. In one embodiment, a large hash value is generated, from which two smaller and uncorrelated hash values are generated. By way of example only and not limitation, a 72 bit hash may be generated, from which a first hash value containing 24 bits and a second hash value containing 48 bits may be derived. The first hash value may be used to identify a search list, while the second hash value may be used to disambiguate the multiple entries in the search list.

The first hash value is used to identify a storage location within a first storage device, as shown at block 408. In one embodiment, the first storage device is RAM, and the storage location is a cacheline in the RAM. The storage location includes a number of data entries, each of which includes a hash value and an address of a posting list.

The identified storage location on the first storage device is read to determine if it contains the second hash value determined for the term, as shown at block 410. If it is determined that the storage location on the first storage device contains the second hash value at block 412, the address stored with the second hash value is retrieved from the storage location on the first storage device, as shown at block 414. The address corresponds with a posting list for the term. As such, the posting list for the term is accessed, as shown at block 416. The posting list is used to generate search results, as shown at block 418. The search results are provided for returning to the end user in response to the original search query, as shown at block 420.

If it is determined at block 412 that the storage location on the first storage device does not contain the second hash value, an address of a storage location on a second storage device is retrieved from the storage location on the first storage device, as shown at block 422. In one embodiment, the second storage device is a flash-based solid state device, and the storage location is a page on the flash-based solid state device. The storage location on the second storage device also includes a number of data entries, each of which includes a hash value and an address of a posting list.

The identified storage location on the second storage device is read to determine if it contains the second hash value determined for the term, as shown at block 424. If it is determined that the storage location on the second storage device contains the second hash value at block 426, the address stored with the second hash value is retrieved from the storage location on the second storage device, as shown at block 428. The address corresponds with a posting list for the term. As such, the posting list for the term is accessed, as shown at block 430. The posting list is used to generate search results, as shown at block 432. The search results are provided for returning to the end user in response to the original search query, as shown at block 434.

If it is determined at block 426 that the storage location on the second storage device does not contain the second hash value, a bloom filter stored at the storage location on the second storage device is checked to determine if the continuation of the search list likely contains the second hash, as shown at block 436. If it is determined at block 438 that the second hash value fails the bloom filter, the access process is abandoned at block 440 as the term is not indexed in the search index. Alternatively, if the second hash value passes the bloom filter at block 438, an address of a storage location on a third storage device is retrieved from the storage location on the second storage device, as shown at block 442. In one embodiment, the second storage device is a hard disk drive, and the storage location is a page file on the hard disk drive.

The storage location on the third storage device includes a number of data entries, each of which includes a hash value and a corresponding posting list.

The identified storage location on the third storage device is read to determine if it contains the second hash value determined for the term, as shown at block 444. If it is determined at block 446 that the storage location on the third storage device does not contain the second hash value, the access process is abandoned at block 448 as the term is not indexed in the search index. Alternatively, if it is determined at block 446 that the storage location on the third storage device contains the second hash value, the posting list stored in association with the second hash value at the storage location on the third storage device is accessed, as shown at block 440. The posting list is used to generate search results, as shown at block 442. The search results are provided for returning to the end user in response to the original search query, as shown at block 444.

As can be understood, embodiments of the present invention provide a priority hash index that allows for efficient lookup of posting lists for terms in a search query to generate search results in response to the search query.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for accessing data from a search index, the method comprising:
   receiving a hash value corresponding with a search term from a search query;
   identifying a first storage location on a first storage device that stores a plurality of data entries each containing an entry hash value corresponding with both a term and an address locating a posting list for the term, the first storage location also storing an address of a second storage location on a second data storage device, the address comprises a continuing search list for identifying the hash value;
   upon determining that the hash value is stored at the first storage location:
      (1) retrieving an address of a posting list from the first storage location is retrieved; and
      (2) accessing the address in the posting list;
   upon determining that the hash value is not stored at the first storage location:
      (1) retrieving an address of the second storage location on the second storage device from the first storage location;
   upon determining that the hash value is stored at the second storage location:
      (1) retrieving an address of a posting list from the second storage location; and
      (2) accessing the address in the posting list;
   upon determining that the hash value is not stored at the second storage location:
      (1) retrieving an address of a third storage location on a third storage device from the second storage location;
   upon determining that the hash value is not stored at the third storage location:
      (1) determining to abandon searching for the hash value; and
   upon determining that the hash value is stored at the third storage location:
      (1) accessing the posting list from the third storage location.

2. The method of claim 1, wherein the first storage location on the first storage device is identified based on a second hash value corresponding with the search term.

3. The method of claim 1, wherein a posting list is accessed, and wherein the method further includes:
   generating search results using the posting list; and
   providing the search results in response to the search query for presentation to an end user.

4. The method of claim 1, wherein the first data storage device is a RAM and the first storage location is a cacheline, wherein the second data storage device is a flash-based solid state device and the second storage location is a page, and wherein the third data storage device is a hard disk drive and the third storage location is a page file.

5. The method of claim 4, wherein importance of a term is determined based on at least one selected from the following: a length of a posting list for the term; and access frequency of a posting list for the term.

6. The method of claim 1, wherein a plurality of hash values are stored on the first, second, and third storage devices from fastest- to slowest-speed storage device based on importance of terms associated with the hash values.

7. The method of claim 1, wherein retrieving the address of the third storage location on the third storage device from the second storage location upon determining that the hash value is not stored at the second storage location includes checking a bloom filter stored at the second storage location and determining that the hash value passes the boom filter.

8. One or more computer-storage media hardware memory devices storing computer-useable instructions that, when used by a computing device, cause the computing device to perform a method comprising:
   receiving a search query;
   identifying a term from the search query;
   hashing the term to generate a first hash value and a second hash value;
   identifying a cacheline in a RAM corresponding with the first hash value, the cacheline containing a plurality of data entries each including a hash value corresponding with a given term and an address of a posting list for the given term, the cacheline having an address of a page in a flash-based solid state device, the address comprises a continuing search list for identifying the hash value;
   upon determining that the cacheline contains the second hash value:
      (1) retrieving from the cacheline an address of a posting list corresponding with the second hash value and using that address to access the posting list;
   upon determining that the cacheline does not contain the second hash value:
      (1) retrieving from the cacheline the address of the page in the flash-based solid state device containing a plurality of data entries each including a hash value corresponding with a given term and an address of a posting list for the given term;
   upon determining that the page contains the second hash value:

(1) retrieving from the page an address of a posting list corresponding with the second hash value and using that address to access the posting list;

upon determining that the page does not contain the second hash value:

(1) employing a bloom filter stored in the page;

upon the second hash value failing the bloom filter:

(1) determining to abandon searching for the second hash value;

upon the second hash value passing the bloom filter:

(1) retrieving from the page an address of a page file in a hard disk drive containing a plurality of data entries each including a hash value corresponding with a given term and a posting list for the given term;

upon determining that the page file does not contain the second hash value:

(1) determining to abandon searching for the second hash value; and upon determining that the page file contains the second hash value:

(1) accessing from the page file a posting list corresponding with the second hash value.

9. The one or more computer storage media of claim 8, wherein first hash value and second hash value are portions of a single hash value.

10. The one or more computer storage media of claim 8, wherein a posting list is accessed, and wherein the method further includes:

generating search results using the posting list; and providing the search results in response to the search query for presentation to an end user.

* * * * *